(12) United States Patent
Suhre et al.

(10) Patent No.: US 9,352,674 B2
(45) Date of Patent: May 31, 2016

(54) PASSENGER SEAT WITH DROP-DOWN ARMREST ASSEMBLY

(71) Applicant: B/E Aerospace, Inc., Wellington, FL (US)

(72) Inventors: Ryan J. Suhre, Winston Salem, NC (US); Mark W. Peurifoy, Kernersville, NC (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/736,394

(22) Filed: Jun. 11, 2015

(65) Prior Publication Data
US 2015/0274302 A1    Oct. 1, 2015

Related U.S. Application Data

(63) Continuation of application No. 14/230,330, filed on Mar. 31, 2014, now Pat. No. 9,150,129.

(60) Provisional application No. 61/808,293, filed on Apr. 4, 2013.

(51) Int. Cl.
*B60N 2/46* (2006.01)
*B64D 11/06* (2006.01)
*B60N 3/00* (2006.01)
*B64D 11/00* (2006.01)

(52) U.S. Cl.
CPC .............. *B60N 2/4606* (2013.01); *B60N 2/464* (2013.01); *B60N 3/002* (2013.01); *B64D 11/0015* (2013.01); *B64D 11/00153* (2014.12); *B64D 11/06* (2013.01); *B64D 11/0638* (2014.12); *B64D 11/0644* (2014.12); *B64D 11/0646* (2014.12); *B64D 11/0647* (2014.12)

(58) Field of Classification Search
CPC ...... B60N 2/4606; B60N 2/464; B60N 3/002; B64D 11/0638
USPC .................... 297/145, 217.3, 411.36
See application file for complete search history.

(56) References Cited

U.S. PATENT DOCUMENTS

| 2,215,758 | A | * | 9/1940 | Knight | .................. | A47C 3/0252 |
| | | | | | | 297/115 |
| 4,953,256 | A | * | 9/1990 | Salmela | .............. | E05D 13/1253 |
| | | | | | | 248/572 |
| D340,235 | S | * | 10/1993 | Robak | .......................... | D12/345 |

(Continued)

FOREIGN PATENT DOCUMENTS

EP    1 078 852 A2    2/2001

OTHER PUBLICATIONS

International Search Report for PCT/US2014/032359 dated Aug. 25, 2014.

*Primary Examiner* — Peter Brown
(74) *Attorney, Agent, or Firm* — Shumaker, Loop & Kendrick, LLP

(57) ABSTRACT

A seat that includes a seat bottom and seat back, an endbay assembly positioned to one side of the seat bottom, and an armrest positioned within the endbay assembly and selectively moveable between an upper position for use as an armrest and a lower position level with an upper seating surface of the seat bottom for allowing ingress and egress to the seat.

10 Claims, 7 Drawing Sheets

(56) References Cited

U.S. PATENT DOCUMENTS

| | | | |
|---|---|---|---|
| 5,547,247 A * | 8/1996 | Dixon | A47C 7/70 297/145 |
| 5,795,025 A | 8/1998 | Murphy | |
| 7,124,984 B2 * | 10/2006 | Yokouchi | F16M 11/24 248/125.8 |
| 7,311,354 B2 | 12/2007 | Giasson | |
| 7,387,342 B1 | 6/2008 | Clough et al. | |
| 7,474,522 B2 * | 1/2009 | Bliven | F16M 11/24 248/157 |
| 7,798,072 B2 * | 9/2010 | Becker | A47C 7/70 108/42 |
| 2006/0102812 A1 * | 5/2006 | Cvek | A47B 21/007 248/125.2 |
| 2008/0099637 A1 * | 5/2008 | Pai | F16M 11/04 248/157 |
| 2009/0243352 A1 | 10/2009 | Cailleteau | |
| 2009/0302158 A1 * | 12/2009 | Darbyshire | B64D 11/06 244/118.6 |
| 2012/0133180 A1 | 5/2012 | Moulton et al. | |

* cited by examiner

PASSENGER SEAT WITH DROP-DOWN ARMREST ASSEMBLY

CROSS REFERENCE TO RELATED APPLICATIONS

This is a continuation application of U.S. patent application Ser. No. 14/230,330 filed Mar. 31, 2014 and U.S. Provisional Patent Application Ser. No. 61/808,293 filed Apr. 4, 2013, the contents of which are incorporated by reference herein.

TECHNICAL FIELD AND BACKGROUND OF THE INVENTION

This application relates to a seating product, particularly a seat such as is provided in business and premium class cabins of passenger aircraft. In aircraft cabins, space is at a premium, and seats are positioned to achieve a balance between passenger comfort, space-saving and safety. Additional considerations include providing an accommodation for disabled, wheelchair-seated or elderly passengers who may find it difficult to maneuver past a conventional passenger seat endbay assembly. Endbays frequently serve as storage areas for deployable tables and thus are required to have a certain minimum amount of interior storage volume. Prior art endbays thus have an armcap at a fixed height that is generally 16-18 cm. above the seating surface of the seat bottom. The endbays include a base that accommodates the stowed table, and the armcap functions both as a lid for the housing and as an armrest.

Therefore, there is a need for a passenger seat that has an armcap that can be lowered to be at the approximate level of the seating surface of the seat bottom to facilitate passenger ingress and egress.

SUMMARY OF THE INVENTION

It is therefore an object of the present invention to provide a passenger seat that has an endbay that moves between a raised armrest position and a lowered, seat access position.

It is a further object of the invention to provide a passenger seat that has an endbay that moves between an upper armrest position and a lower, seat access position, and that includes an endbay base that stows a deployable table.

These and other objects and advantages of the present invention are achieved by providing a seat that includes a seat base, a seat bottom and seat back operatively associated with the base. An endbay assembly is provided that defines an armrest housing positioned to one side of the seat bottom. An armrest assembly having an upper arm support surface is positioned in the armrest assembly of the endbay assembly and is selectively moveable between a raised position extended from the armrest housing and a lowered position within the armrest housing with the upper arm support surface aligned with a seating surface of the seat bottom for facilitating lateral ingress and egress of a seat occupant from a position to and from one side of the seat.

According to another embodiment of the invention, the seat includes a head rest mounted on a top end of the seat back and a leg rest and foot rest mounted forward of the seat bottom and adapted to move between a stowed position and a deployed, extended position to support the legs and feet of the seat occupant in an elevated condition.

According to another embodiment of the invention, the armrest assembly includes a tray table carried by the armrest assembly and moveable between a lowered, stowed position against a major vertical surface of the armrest assembly and a raised, deployed position perpendicular to the major vertical surface of the armrest assembly and extending at least partially laterally across and above the seat bottom.

According to another embodiment of the invention, the tray table includes a cantilevered support arm connecting the tray table to the armrest assembly and supporting the tray table in its deployed position.

According to another embodiment of the invention, the upper arm support surface is a padded armcap.

According to another embodiment of the invention, the padded armcap is mounted by one side to the armrest assembly and comprises a top-opening cover for covering and enclosing the endbay assembly.

According to another embodiment of the invention, the endbay assembly includes a structural plate on which is mounted a lock assembly that maintains the armrest in its lowered position in the endbay assembly when stowed.

According to another embodiment of the invention, the structural plate includes a tray table spring reel connected by cabling to the armrest to provide a spring assist in lifting the tray table into its upper, deployed position.

According to another embodiment of the invention, a vertically-extending stationary tray table rack cooperates with a tray table rack gear carried by the armrest to guide the tray table during movement.

According to another embodiment of the invention, an armrest spring reel and an armrest rack cooperates with an armrest rack gear for providing a spring assist when being moved to its upper position extended from the armrest housing.

According to another embodiment of the invention, an aircraft passenger seat is provided that includes a seat base and a seat bottom and seat back operatively associated with the base. A head rest is mounted on a top end of the seat back and a leg rest and foot rest is mounted forward of the seat bottom and adapted to move between a stowed position and a deployed, extended position to support the legs and feet of a seat occupant in an elevated condition. An endbay assembly defines an armrest housing positioned to one side of the seat bottom and includes a structural plate on which is mounted a lock assembly that maintains the armrest in its lowered position in the endbay assembly when stowed. An armrest assembly is provided that includes an upper arm support surface defined by an armcap positioned on the endbay assembly and selectively moveable between a raised position extended from the armrest housing, and a lowered position within the armrest housing with the upper arm support surface aligned with a seating surface of the seat bottom for facilitating lateral ingress and egress to the seat of a seat occupant from a position to one side of the seat. A tray table is carried by the armrest assembly and is moveable between a lowered, stowed position against a major vertical surface of the armrest assembly and a raised, deployed position perpendicular to the major vertical surface of the armrest assembly. The tray table extends at least partially laterally across and above the seat bottom, and a tray table spring reel is connected by cabling to the armrest to provide a spring assist in lifting the tray table into its upper, deployed position.

According to another embodiment of the invention, an aircraft passenger seating unit is provided that includes a seat base and first and second seats positioned on the base, each seat including a bottom and seat back operatively associated with the base, a head rest mounted on a top end of the seat back and a leg rest and foot rest mounted forward of the seat bottom and adapted to move between a stowed position and a deployed, extended position to support the legs and feet of respective first and second seat occupants in an elevated condition. A first endbay assembly is positioned on an outboard side of the first seat and a second endbay assembly is positioned on an outboard side of the second seat. The first end bay assembly and the second endbay assembly each define an armrest housing positioned to one side of the seat bottom and including a structural plate on which is mounted a lock assembly that maintains the armrest in its lowered position in the endbay assembly when stowed. An armrest assembly is provided in each endbay assembly and includes an upper arm support surface defined by an armcap, positioned on the endbay assembly and selectively moveable between a raised position extended from the armrest housing, and a lowered position within the armrest housing with the upper arm support surface aligned with a seating surface of the seat bottom for facilitating lateral ingress and egress to the seat of a seat occupant from a position to one side of the seat. A tray table is carried by the armrest assembly and is moveable between a lowered, stowed position against a major vertical surface of the armrest assembly and a raised, deployed position perpendicular to the major vertical surface of the armrest assembly and extending at least partially laterally across and above the seat bottom, and a tray table spring reel connected by cabling to the armrest to provide a spring assist in lifting the tray table into its upper, deployed position. A center console is positioned between the first and second seats.

According to another embodiment of the invention, the center console includes a storage compartment for first and second video monitors.

According to another embodiment of the invention, a top surface of the console includes inboard armcaps that serve as armrests in a closed position, and open to allow deployment of first and second video monitors.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
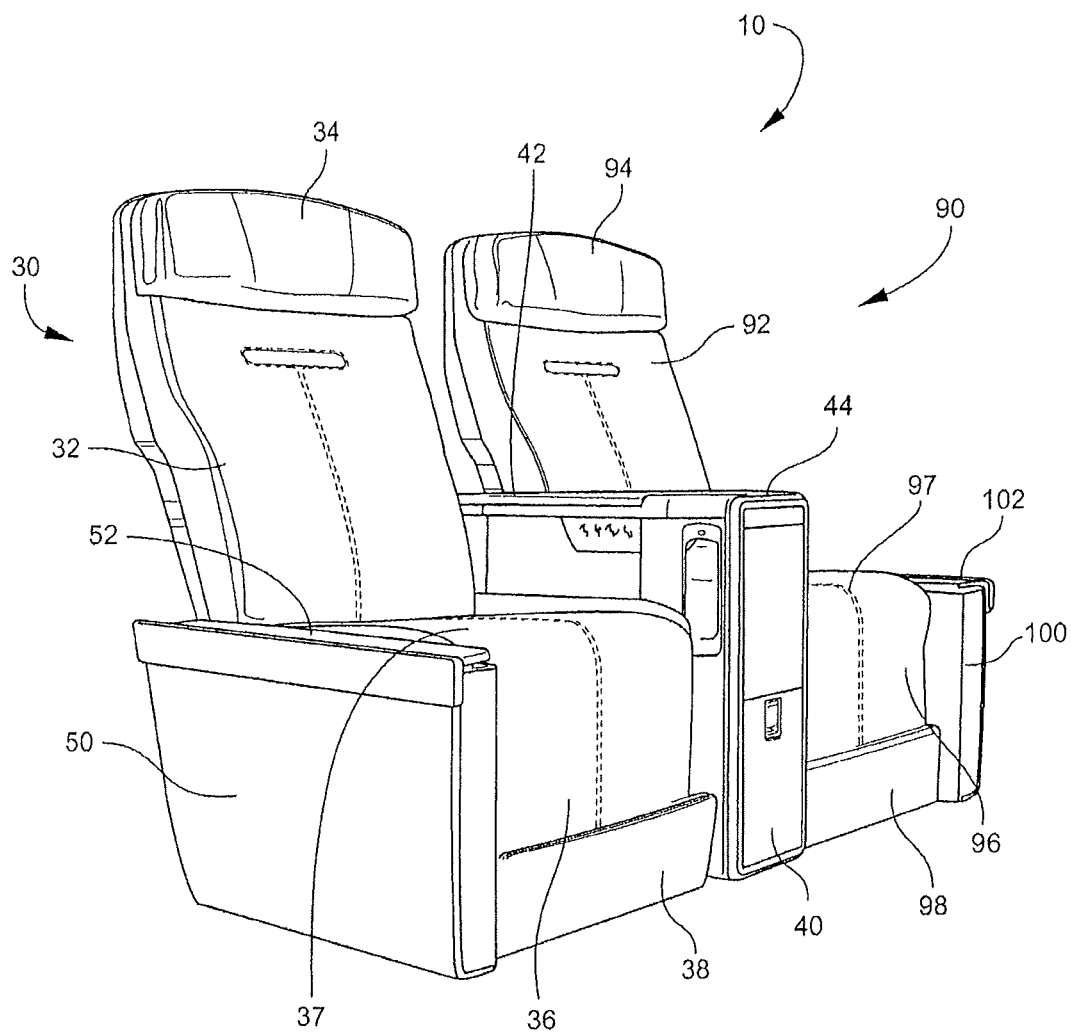
FIG. 1 is a perspective view of a pair of passenger seats in an upright position and with respective armrests in a lowered, seat access position.

Referring now specifically to the drawings, seating unit 10 including a pair of passenger seats 30 and 90. Seat 30 includes a seat back 32 that is preferably adapted to move between upright TTOL and variable recline positions. A headrest 34 is positioned on a top end of the seat back 32 to provide comfort and support to the seat occupant's head and neck. A seat bottom 36 and foot rest 38 provide a seating surface and an extendable leg and foot support, respectively. The seat bottom 36 has an upper seating surface 37 that accommodates the buttocks and upper legs of the seat occupant.

A center console 40 provides space between the seats 30 and 90, storage for video monitors, seat, video, and audio controls, call button and other typical functions. The top of the console 40 includes inboard armcaps 42, 44 that serve as armrests in a closed position, and open to allow deployment of video monitors.

Seat 30 includes an endbay assembly 50 in which is mounted an outboard armrest 52, shown in its lowered, seat access position in FIG. 1. In this position, the top of the armrest 52 is approximately level with the upper seating surface 37 of the seat bottom 36. Seat 90 includes a seat back 92 that is preferably adapted to move between upright TTOL and variable recline positions. A headrest 94 is positioned on a top end of the seat back 92 to provide support to the seat occupant's head and neck. A seat bottom 96 and foot rest 98 provide a seating surface and an extendable leg and foot support, respectively. The seat bottom 96 has an upper seating surface 97 that accommodates the buttocks and upper legs of the seat occupant. Seat 90 shares the console 40 with seat 30.

Figure 2:
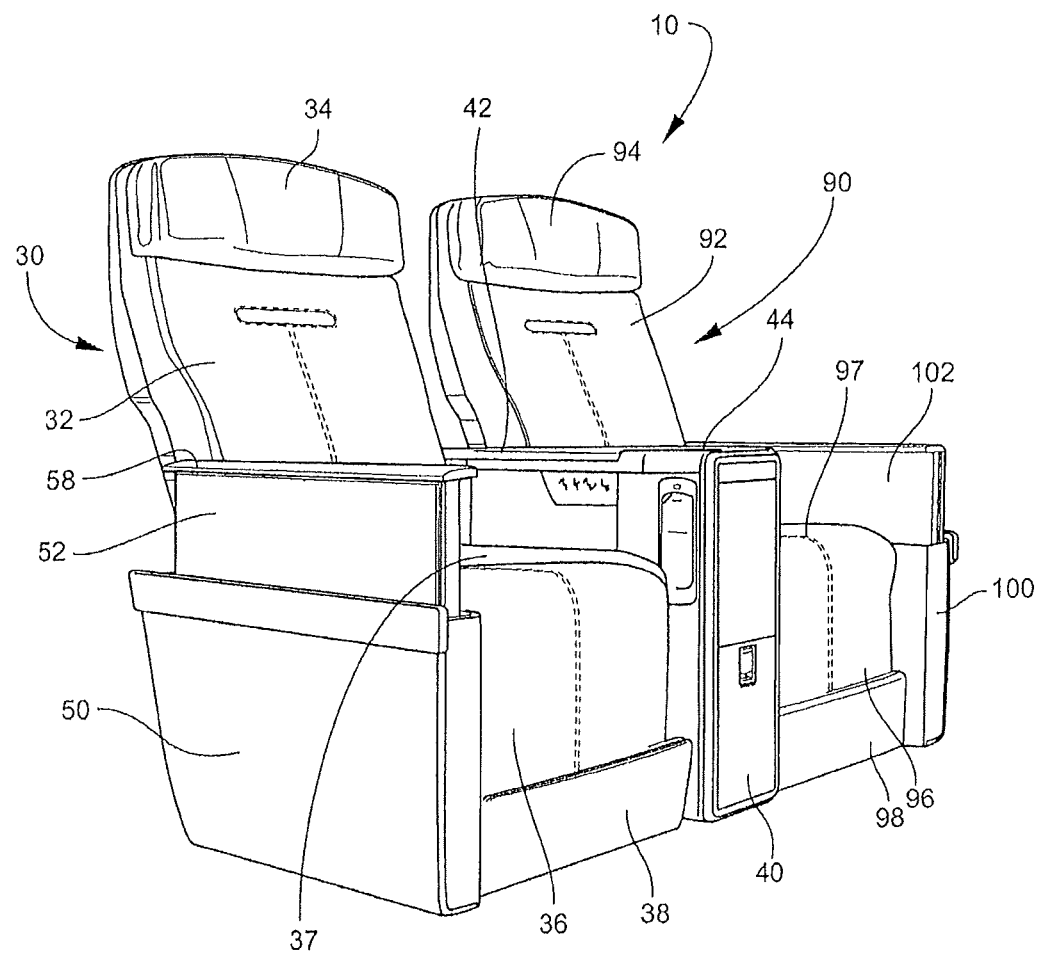
FIG. 2 is a perspective view of a pair of passenger seats in an upright position and with respective armcaps in a raised, armrest position.
Figure 3:
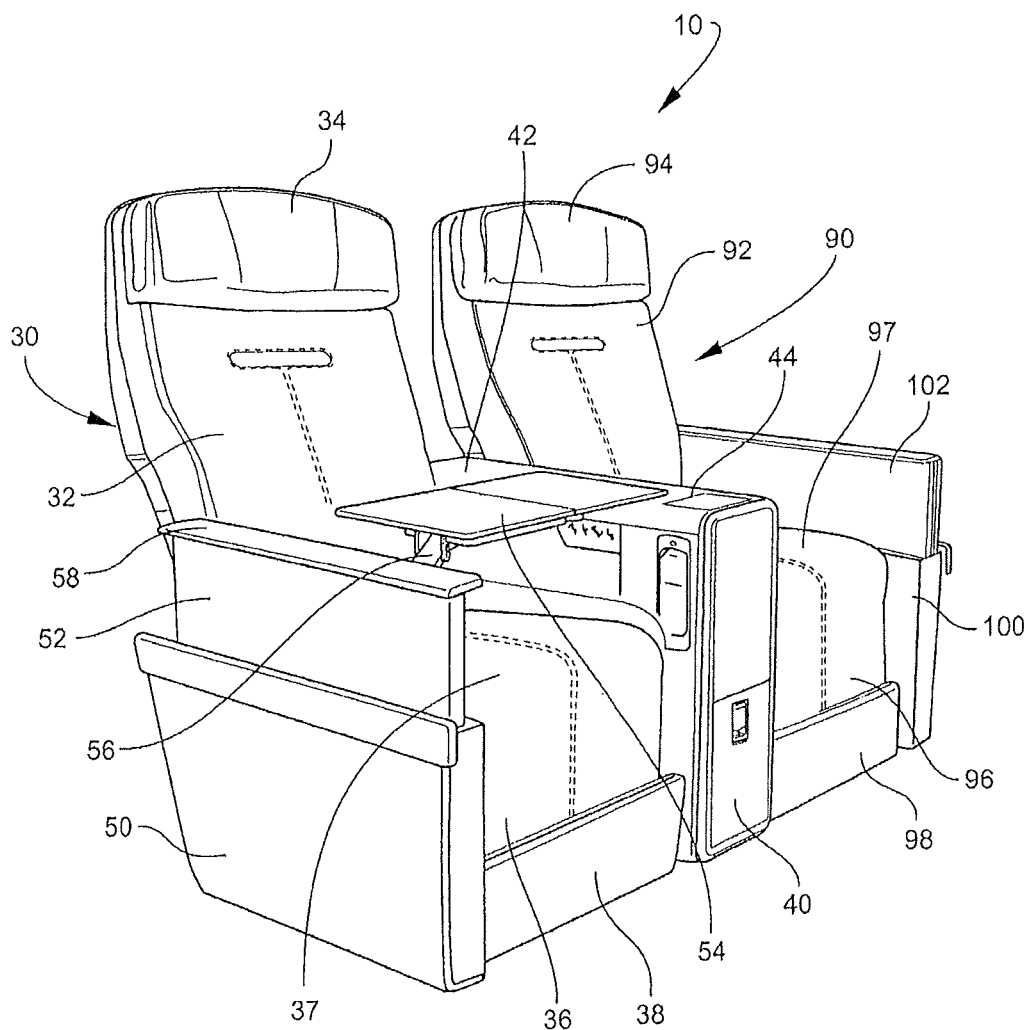
FIG. 3 is a perspective view of a pair of passenger seats in an upright position and with respective armcaps in a raised, armrest position, with a table normally stowed in the endbay deployed into a use position.
Figure 4:
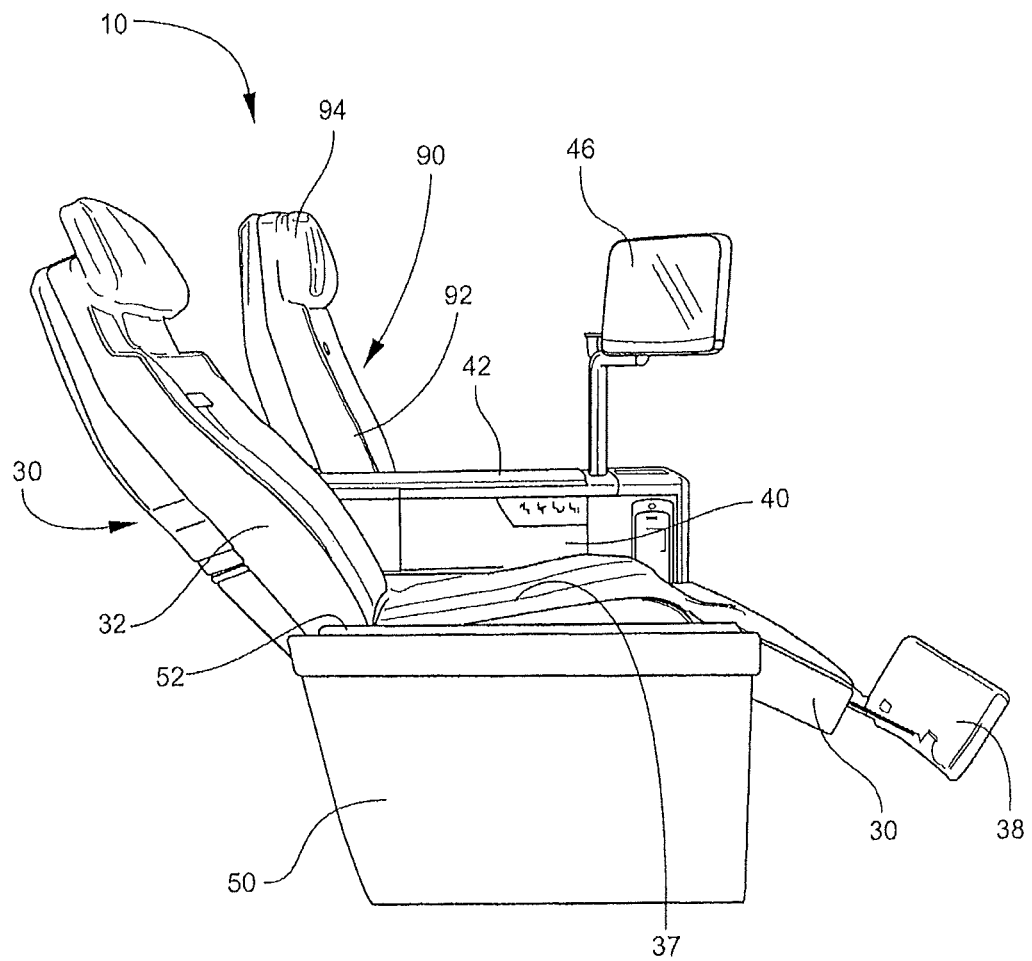
FIG. 4 is a side elevation view of a pair of passenger seats in respective recline and upright positions, and with respective armcaps in a lowered, seat access position.

Seat 90 includes an endbay assembly 100 in which is mounted an outboard armrest 102, shown in its lowered, seat access position in FIG. 1. In this position, the top of the outboard armrest 102 is approximately level with the upper seating surface 97 of the seat bottom 96. FIG. 2 shows the armrests 52, 102 of seats 30, 90, respectively, in their upper, armrest positions approximately 16-19 cm. above the seating surfaces 37, 97. FIG. 3 shows the armrest 52, 102 of seats 30, 90, respectively, in their upper, armrest positions, as in FIG. 2, with a table 54 shown deployed into a use position spanning the distance between the armrest 52 and the console 40. As is shown in FIG. 4, a video monitor 42 is deployed into a viewing position for an occupant of seat 30, and the seat back 34 and foot rest 38 are reclined and extended, respectively, to provide a recline position for a seat occupant.

The remainder of the description proceeds principally with respect to seat 30. The seat 90 includes the same features as seat 30 and functions in the same manner, specifically with respect to the operation of the endbay assemblies 50 and 100, respectively. The endbay assembly 50 is a right-hand endbay, and the endbay assembly 100 is a left-hand endbay, with identical functions.

Figure 5:
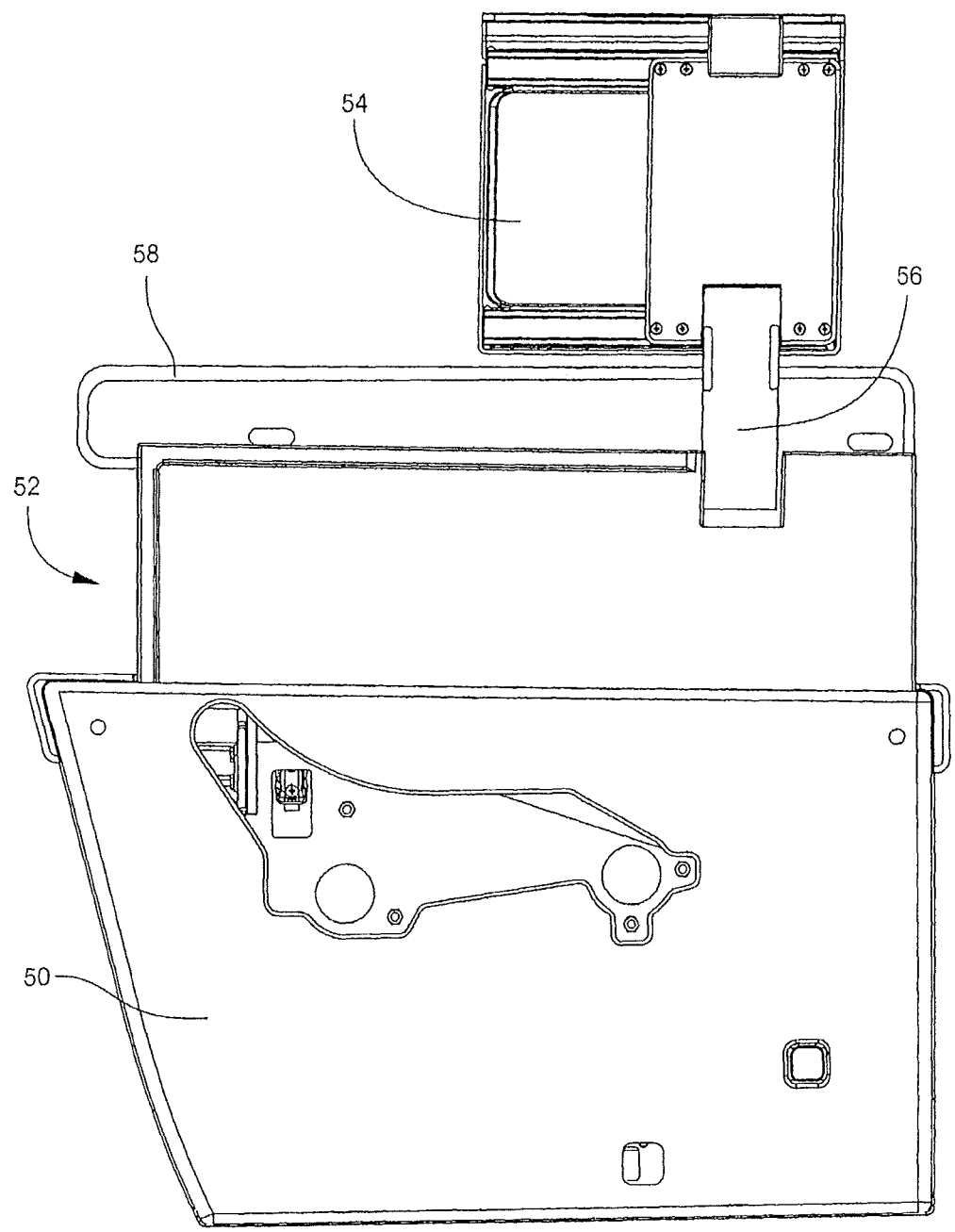
FIG. 5 is a side elevation showing the table in an intermediate position and the armcap in its upper, armrest position.

Referring now to FIG. 5, endbay assembly 50 serves as an enclosure for the armrest 52. A padded armcap 58 is mounted to the top of the armrest 52 and serves as the arm support portion of the armrest 52 when in the position shown in, for example, FIG. 1, and when open as shown in FIG. 3, permits the table 54 to be raised out of its stowed position. Table 54 is mounted on a cantilevered support arm 56 that permits the table, when raised, to be pivoted 90 degrees into its use position. The cantilever configuration of the support arm 56 provides support to the bottom of the table 54, as shown in FIG. 3. When the table 54 is deployed, the cantilever configuration of the support arm 56 also permits the armcap 58 to be returned to its closed position for use as the support surface of the armrest 52 by the seat occupant.

Figure 6:
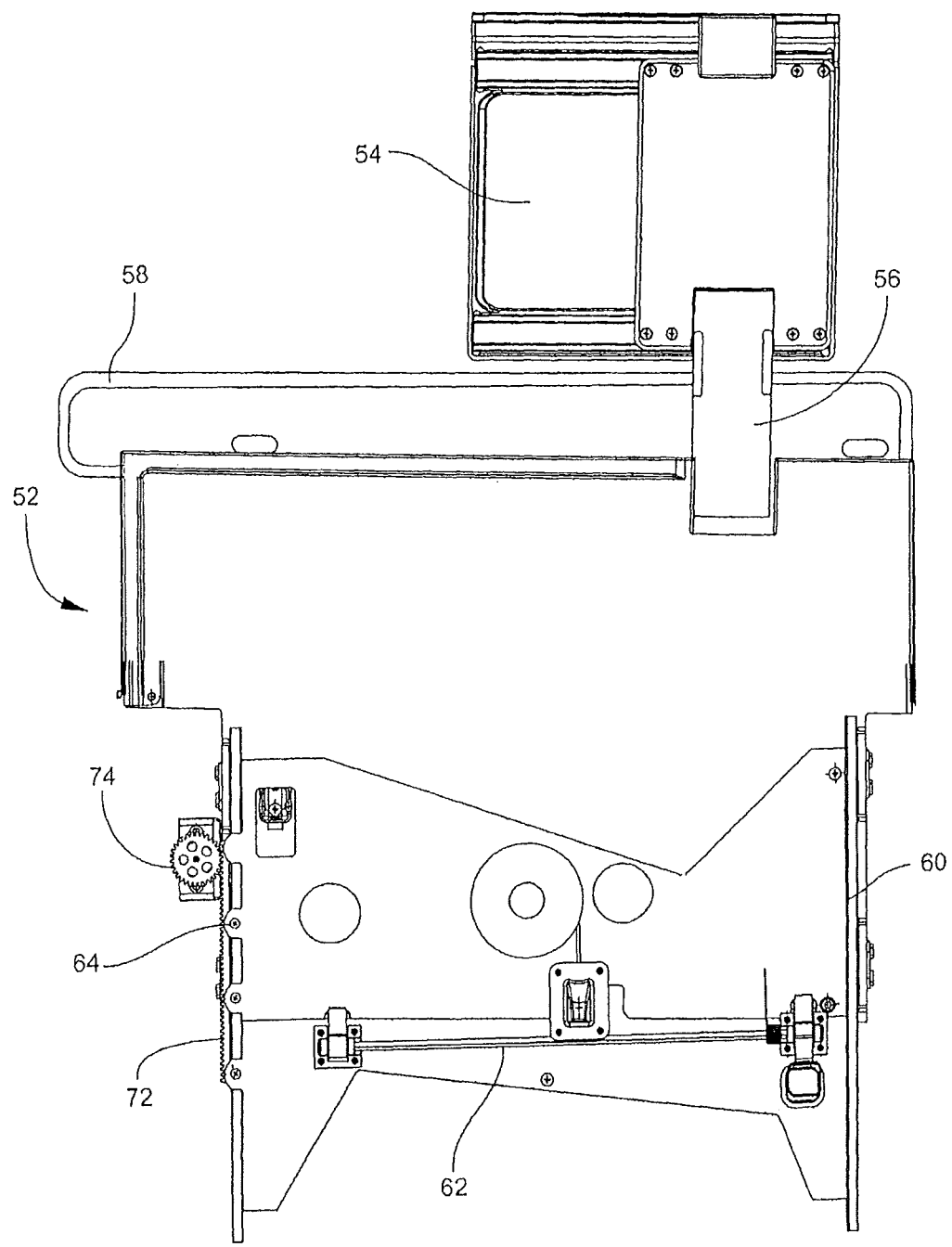
FIG. 6 is side elevation showing the table in an intermediate position and the armcap in its upper, armrest position, with parts removed to show the lock mechanism and spring reel assemblies.
Figure 7:
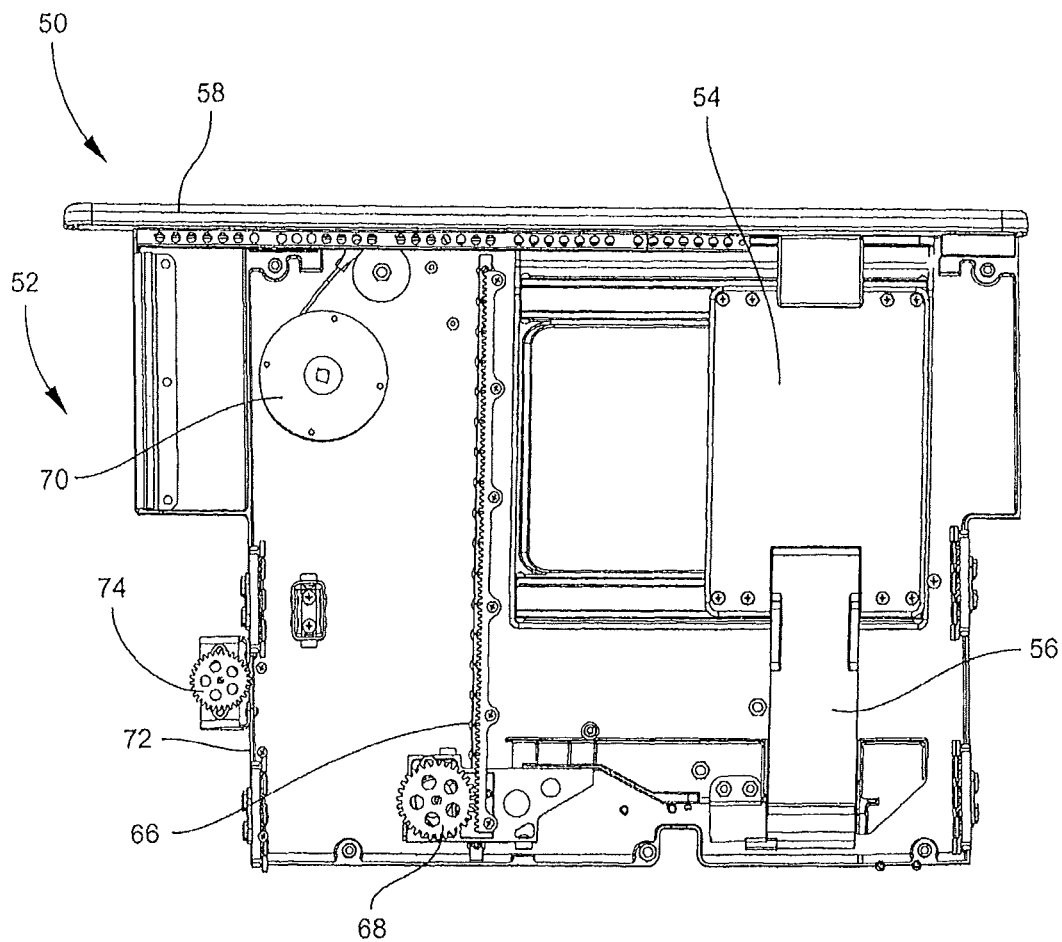
FIG. 7 is a fragmentary side elevation with the table moved to its stowed position and the armcap closed.

Referring now to FIGS. 6-7, the armrest 52 is shown in its lowered position in the endbay assembly 50. The endbay assembly 50 includes a lower structural plate 60 on which is mounted a lock assembly 62 that maintains the armrest 52 in its lowered position in the endbay assembly 50. A spring reel 64 is connected by appropriate cabling to the armrest 52 and provides a spring assist in lifting the table 54 into its upper position, as shown in FIGS. 5 and 6. The table 54 is guided by a rack 66 that interconnects with a rack gear 68. See FIG. 7.

As also shown in FIG. 7, the armrest 52 is provided a spring assist when being raised by a spring reel 70 and appropriate cabling. The armrest 52 is guided by a rack 72 that interconnects with a rack gear 74.

A passenger seat with drop-down armrest assembly according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A seat, comprising
   (a) a seat base;
   (b) a seat bottom and seat back operatively associated with the base;
   (c) an endbay assembly defining an armrest housing positioned to one side of the seat bottom;
   (d) an armrest assembly having an upper arm support surface positioned in the armrest assembly of the endbay assembly and selectively moveable between a raised position extended from the armrest housing and a lowered position within the armrest housing with the upper arm support surface aligned with a seating surface of the seat bottom for facilitating lateral ingress and egress of a seat occupant from a position to and from one side of the seat;
   (e) an armrest spring reel and an armrest rack cooperating with an armrest rack gear for providing a spring assist when moving the armrest assembly toward the raised position;
   (f) a tray table moveable between a raised position extended from the armrest housing and a lowered position within the armrest housing, the tray table supported by a cantilevered support arm supporting the tray table in a horizontal orientation in the raised position and a vertical orientation in the lowered position; and
   (g) a tray table spring reel having cabling connected to the armrest assembly providing spring assist when moving the tray table toward the raised position and a tray table rack cooperating with a tray table rack gear for guiding vertical movement of the tray table.

2. A seat according to claim 1, wherein the seat includes a head rest mounted on a top end of the seat back and a leg rest and foot rest mounted forward of the seat bottom and adapted to move between a stowed position and a deployed, extended position to support the legs and feet of the seat occupant in an elevated condition.

3. A seat according to claim 1, wherein the upper arm support surface comprises a padded armcap.

4. A seat according to claim 3, wherein the padded armcap is mounted by one side to the armrest assembly and comprises a top-opening cover for covering and enclosing the endbay assembly.

5. A seat according to claim 1, wherein the endbay assembly includes a structural plate on which is mounted a lock assembly that maintains the armrest in its lowered position in the endbay assembly when stowed.

6. An aircraft passenger seat, comprising:
   (a) a seat base;
   (b) a seat bottom and seat back operatively associated with the base, a head rest mounted on a top end of the seat back and a leg rest and foot rest mounted forward of the seat bottom and adapted to move between a stowed position and a deployed, extended position to support the legs and feet of a seat occupant in an elevated condition;
   (c) an endbay assembly defining an armrest housing positioned to one side of the seat bottom and including a structural plate on which is mounted a lock assembly that maintains the armrest in its lowered position in the endbay assembly when stowed;
   (d) an armrest assembly, including an upper arm support surface defined by an armcap, positioned on the endbay assembly and selectively moveable with a spring assist between a raised position extended from the armrest housing, and a lowered position within the armrest housing with the upper arm support surface aligned with a seating surface of the seat bottom for facilitating lateral ingress and egress to the seat of a seat occupant from a position to one side of the seat; and
   (e) a tray table moveable between a raised position extended from the armrest housing and a lowered position within the armrest housing, the tray table supported by a cantilevered support arm supporting the tray table in a horizontal orientation in the raised position and a vertical orientation in the lowered position, and a tray table spring reel providing spring assist when moving the tray table toward the raised position and a tray table rack cooperating with a tray table rack gear for guiding vertical movement of the tray table.

7. An aircraft passenger seat according to claim 6, wherein the padded armcap is mounted by one side to the endbay assembly and comprises a top-opening cover for covering the endbay assembly.

8. An aircraft passenger seating unit, comprising:
   (a) a seat base;
   (b) first and second seats positioned on the base, each seat including a bottom and seat back operatively associated with the base, a head rest mounted on a top end of the seat back and a leg rest and foot rest mounted forward of the seat bottom and adapted to move between a stowed position and a deployed, extended position to support the legs and feet of respective first and second seat occupants in an elevated condition;
   (c) first endbay assembly positioned on an outboard side of the first seat and a second endbay assembly positioned on an outboard side of the second seat, the first end bay assembly and the second endbay assembly each defining:
      (i) an armrest housing positioned to one side of the seat bottom and including a structural plate on which is mounted a lock assembly that maintains the armrest in its lowered position in the endbay assembly when stowed;
      (ii) an armrest assembly, including an upper arm support surface defined by an armcap, positioned on the endbay assembly and selectively moveable between a raised position extended from the armrest housing, and a lowered position within the armrest housing with the upper arm support surface aligned with a seating surface of the seat bottom for facilitating lateral ingress and egress to the seat of a seat occupant from a position to one side of the seat;

(iii) an armrest spring reel and an armrest rack cooperating with an armrest rack gear for providing a spring assist when being moved to its upper position extended from the armrest housing;

(iv) a tray table carried by the armrest assembly and moveable between a lowered, stowed position against a major vertical surface of the armrest assembly and a raised, deployed position perpendicular to the major vertical surface of the armrest assembly and extending at least partially laterally across and above the seat bottom, the tray table supported by a cantilevered support arm supporting the tray table in a horizontal orientation in the raised position and a vertical orientation in the lowered position, and a tray table spring reel connected by cabling to the armrest to provide a spring assist in lifting the tray table into its upper, deployed position; and (d) a center console positioned between the first and second seats.

9. An aircraft passenger seating unit according to claim 8, wherein the center console includes a storage compartment for first and second video monitors.

10. An aircraft passenger seating unit according to claim 8, wherein a top surface of the console includes inboard armcaps that serve as armrests in a closed position, and open to allow deployment of first and second video monitors.

* * * * *